United States Patent
Lei

(10) Patent No.: US 12,283,132 B2
(45) Date of Patent: Apr. 22, 2025

(54) VEHICLE COMMUNICATION METHOD AND APPARATUS BASED ON ETC SYSTEM, MEDIUM, AND ELECTRONIC DEVICE

(71) Applicant: Tencent Technology (Shenzhen) Company Limited, Shenzhen (CN)

(72) Inventor: Yixue Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 161 days.

(21) Appl. No.: 17/971,492

(22) Filed: Oct. 21, 2022

(65) Prior Publication Data
US 2023/0043268 A1    Feb. 9, 2023

Related U.S. Application Data

(63) Continuation of application No. PCT/CN2021/116083, filed on Sep. 2, 2021.

(30) Foreign Application Priority Data

Sep. 25, 2020 (CN) .......................... 202011024751.9

(51) Int. Cl.
*G07B 15/06* (2011.01)
*H04W 4/44* (2018.01)
*H04W 76/10* (2018.01)

(52) U.S. Cl.
CPC ............ *G07B 15/063* (2013.01); *H04W 4/44* (2018.02); *H04W 76/10* (2018.02); *G06Q 2240/00* (2013.01)

(58) Field of Classification Search
CPC . G07B 15/063; G06Q 2240/00; H04W 76/10; H04W 4/44; H04W 4/40

(Continued)

(56) References Cited

U.S. PATENT DOCUMENTS 5,424,727 A * 6/1995 Shieh ..................... G08G 1/017
340/10.5
9,911,329 B1 * 3/2018 Gordon ..................... H04W 4/44
(Continued)

FOREIGN PATENT DOCUMENTS

CN         108269416 A     7/2018
CN         108520626 A     9/2018
(Continued)

OTHER PUBLICATIONS

Naude, "Some like it HOT: A comparison of Toll Roads and High Occupancy Toll Lanes", Australasian Transport Research Forum Proceedings, Sep. 28-30, 2011, pp. 1-15. (Year: 2011).*

(Continued)

*Primary Examiner* — Jeff Zimmerman
*Assistant Examiner* — Brian A Tallman
(74) *Attorney, Agent, or Firm* — Morgan, Lewis & Bockius LLP

(57) ABSTRACT

This application provide a vehicle communication method performed by an electronic toll collection (ETC) system. The ETC system includes an ETC roadside unit (RSU) and an ETC onboard unit (OBU), and the vehicle communication method includes: establishing, when an ETC OBU of any vehicle is detected, a connection between the ETC OBU and the ETC RSU; performing ETC billing on the vehicle through the ETC RSU after the ETC RSU establishes the connection with the ETC OBU; and performing, after the ETC RSU performs ETC billing, vehicle communication message interaction with the ETC OBU through the ETC RSU via the connection with the ETC OBU when the ETC OBU is still within a communication range of the ETC RSU.

20 Claims, 5 Drawing Sheets

(58) Field of Classification Search
USPC .......................................................... 705/13
See application file for complete search history.

(56) References Cited

U.S. PATENT DOCUMENTS

| | | | | |
|---|---|---|---|---|
| 2006/0106671 | A1* | 5/2006 | Biet | G07B 15/063 705/13 |
| 2009/0121898 | A1* | 5/2009 | Jia | G07B 15/063 340/928 |
| 2012/0071191 | A1* | 3/2012 | Tijink | G07B 15/06 455/517 |
| 2012/0166256 | A1* | 6/2012 | Wang | G07B 15/063 455/67.14 |
| 2018/0005458 | A1* | 1/2018 | Iehara | G07B 15/063 |
| 2018/0279068 | A1* | 9/2018 | Yamashiro | H04W 4/027 |
| 2018/0332585 | A1* | 11/2018 | Faurie | H04W 72/12 |
| 2019/0047574 | A1* | 2/2019 | Nishi | B60W 40/068 |
| 2019/0174344 | A1* | 6/2019 | Karella | H04W 24/10 |
| 2022/0028181 | A1* | 1/2022 | Fang | G07F 13/025 |

FOREIGN PATENT DOCUMENTS

| | | |
|---|---|---|
| CN | 209281637 U | 8/2019 |
| CN | 110766941 A | 2/2020 |
| CN | 111554108 A | 8/2020 |
| CN | 112188435 A | 1/2021 |
| EP | 3310118 A1 | 4/2018 |
| JP | 2003123109 A | 4/2003 |
| WO | WO 2019229941 A1 | 12/2019 |

OTHER PUBLICATIONS

Hoffmann et al. "P4TC—Provably-Secure yet Practical Privacy-Preserving Toll Collection", Cryptology ePrint Archive, 2018. p. 1-102. (Year: 2018).*

Randriamasy et al. "Formally Validated of Novel Tolling Service With the ITS-G5" (IEEE Access: vol. 7, 2019), p. 41133-41144. (Year: 2019).*

Tencent Technology, ISR, PCT/CN2021/116083, Nov. 23, 2021, 2 pgs.

Tencent Technology, WO, PCT/CN2021/116083, Nov. 24, 2021, 5 pgs.

Tencent Technology, IPRP, PCT/CN2021/116083, Mar. 28, 2023, 6 pgs.

* cited by examiner

VEHICLE COMMUNICATION METHOD AND APPARATUS BASED ON ETC SYSTEM, MEDIUM, AND ELECTRONIC DEVICE

CROSS-REFERENCE TO RELATED APPLICATIONS

This application is a continuation application of PCT Patent Application No. PCT/CN2021/116083, entitled "ETC SYSTEM-BASED VEHICLE COMMUNICATION METHOD AND APPARATUS, MEDIUM, AND ELECTRONIC DEVICE" filed on Sep. 2, 2021, which claims priority to Chinese Patent Application No. 202011024751.9, filed with the State Intellectual Property Office of the People's Republic of China on Sep. 25, 2020, and entitled "VEHICLE COMMUNICATION METHOD AND APPARATUS BASED ON ETC SYSTEM, MEDIUM, AND ELECTRONIC DEVICE", all of which are incorporated herein by reference in their entirety.

FIELD OF THE TECHNOLOGY

This application relates to the field of computer and communication technologies, and specifically, to a vehicle communication method and apparatus based on an electronic toll collection (ETC) system, a medium, and an electronic device.

BACKGROUND OF THE DISCLOSURE

Vehicle to everything (V2X) communication is to provide vehicle information through sensors, vehicle terminals, and the like mounted on vehicles, and to achieve vehicle-to-vehicle (V2V) communication, vehicle to infrastructure (V2I) communication, vehicle to pedestrian (V2P) communication, and vehicle to network (V2N) communication by using various communication technologies.

At present, the V2X communication is mainly cellular-V2X (C-V2X) communication, and the popularity rate of C-V2X is relatively low, resulting in a relatively low overall coverage rate of the V2X communication.

SUMMARY

Embodiments of this application provide a vehicle communication method and apparatus based on an ETC system, a medium, and an electronic device.

A vehicle communication method based on an ETC system is provided, the ETC system including an ETC roadside unit (RSU) and an ETC onboard unit (OBU), the vehicle communication method being performed by the ETC RSU or an ETC backend system corresponding to the ETC RSU, and including:
   establishing, when an ETC OBU of any vehicle is detected, a connection between the ETC OBU and the ETC RSU;
   performing ETC billing on the vehicle through the ETC RSU after the ETC RSU establishes the connection with the ETC OBU; and
   performing, after the ETC RSU performs ETC billing, vehicle communication message interaction with the ETC OBU through the ETC RSU via the connection with the ETC OBU when the ETC OBU is still within a communication range of the ETC RSU.

A vehicle communication method based on an ETC system is provided, the ETC system including an ETC RSU and an ETC OBU, the vehicle communication method being performed by a vehicle-road collaboration platform, and including:
   acquiring performance data of the ETC system; and
   transmitting an interaction instruction to the ETC RSU in response to determining, according to the performance data of the ETC system, that a target vehicle is capable of receiving a vehicle communication message transmitted by the ETC RSU during passing through a coverage of the ETC RSU, the interaction instruction being used for instructing the ETC RSU to perform vehicle communication message interaction with the ETC OBU boarded on the target vehicle after performing ETC billing on the target vehicle.

A vehicle communication method based on an ETC system is provided, the ETC system including an ETC RSU and an ETC OBU, the vehicle communication method being performed by a vehicle terminal, an ETC OBU being mounted on the vehicle terminal, and the vehicle communication method including:
   establishing a connection with the ETC RSU through the ETC OBU when a request message transmitted by the ETC RSU is detected, the ETC RSU being configured to perform ETC billing on the vehicle terminal after the ETC OBU establishes the connection with the ETC RSU; and
   performing, after the ETC RSU performs ETC billing, vehicle communication message interaction with the ETC RSU when the ETC OBU is still within a communication range of the ETC RSU.

A vehicle communication apparatus based on an ETC system is provided, the ETC system including an ETC RSU and an ETC OBU, the vehicle communication apparatus including:
   a first establishment unit, configured to establish, when an ETC OBU of any vehicle is detected, a connection between the ETC OBU and the ETC RSU;
   a first processing unit, configured to perform ETC billing on the vehicle through the ETC RSU after the ETC RSU establishes the connection with the ETC OBU; and
   a second processing unit, configured to perform, after the ETC RSU performs ETC billing, vehicle communication message interaction with the ETC OBU through the ETC RSU via the connection with the ETC OBU when the ETC OBU is still within a communication range of the ETC RSU.

A vehicle communication apparatus based on an ETC system is provided, the ETC system including an ETC RSU and an ETC OBU, the vehicle communication apparatus including:
   an acquisition unit, configured to acquire performance data of the ETC system; and
   a transmission unit, configured to transmit an interaction instruction to a specified ETC RSU in response to determining, according to the performance data of the ETC system, that a target vehicle is capable of receiving a vehicle communication message transmitted by the ETC RSU during passing through a coverage of the ETC RSU, the interaction instruction being used for instructing the ETC RSU to perform vehicle communication message interaction with the ETC OBU boarded on the target vehicle after performing ETC billing on the target vehicle.

A vehicle communication apparatus based on an ETC system is provided, the ETC system including an ETC RSU and an ETC OBU, the vehicle communication apparatus including:

a second establishment unit, configured to establish a connection with the ETC RSU through the ETC OBU when a request message transmitted by the ETC RSU is detected, the ETC RSU being configured to perform, after the ETC OBU establishes the connection with the ETC RSU, ETC billing on a vehicle terminal on which the ETC OBU is mounted; and a third processing unit, configured to perform, after the ETC RSU performs ETC billing, vehicle communication message interaction with the ETC RSU when the ETC OBU is still within a communication range of the ETC RSU.

An electronic device acting as an electronic toll collection (ETC) system is provided, including a memory and one or more processors, the memory storing computer-readable instructions, the computer-readable instructions, when executed by the one or more processors, causing the ETC system to perform the steps in the foregoing vehicle communication method.

One or more non-transitory computer-readable storage media storing computer-readable instructions are provided, the computer-readable instructions, when executed by one or more processors of an electronic device acting as an electronic toll collection (ETC) system, causing the ETC system to perform the steps in the foregoing vehicle communication method.

A computer program product or a computer program is provided, the computer program product or the computer program including computer-readable instructions, the computer-readable instructions being stored in a non-transitory computer-readable storage medium, a processor of a computer device acting as an ETC system reading the computer-readable instructions from the non-transitory computer-readable storage medium, and the processor executing the computer-readable instructions to cause the computer device to perform the steps in the foregoing vehicle communication method.

Details of one or more embodiments of this application are provided in the subsequent accompanying drawings and descriptions. Other features, objectives, and advantages of this application are illustrated in the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
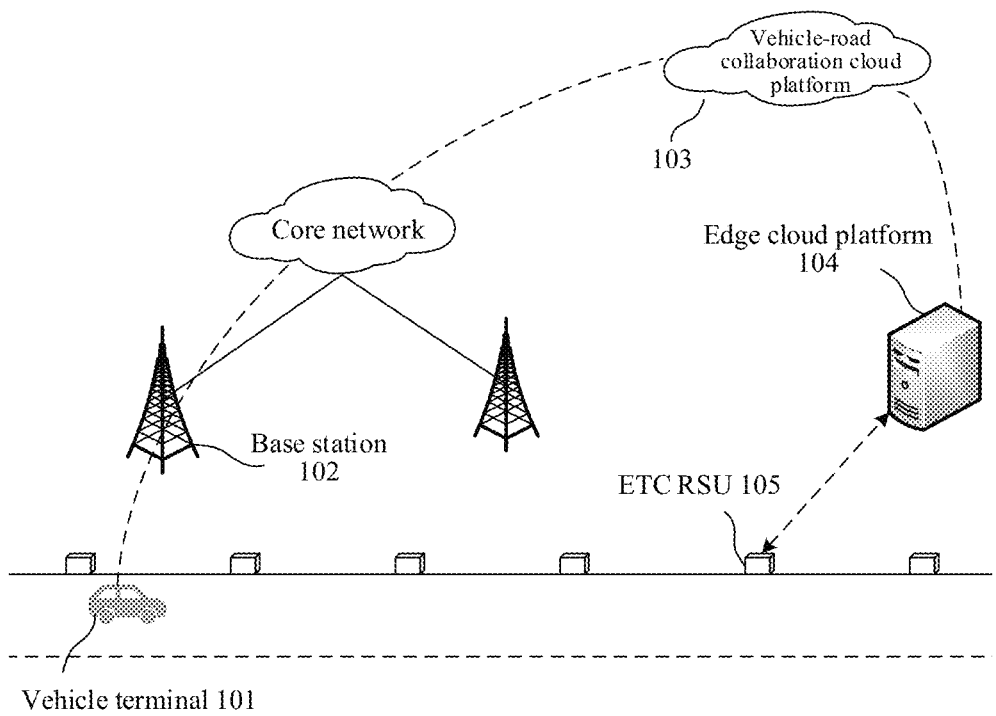
FIG. 1 is a schematic diagram of an exemplary system architecture to which a technical solution according to an embodiment of this application is applicable.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The "C" in C-V2X refers to cellular. C-V2X is a wireless communication technology for vehicles formed by the evolution based on the 2nd generation (2G)/3rd generation (3G)/4th generation (4G)/5th generation (5G) and other cellular network communication technologies, including two types of communication interfaces: one being short-distance direct communication interfaces (that is, PC5 interfaces) between vehicles, people and roads, and the other being communication interfaces (that is, Uu interfaces) between terminals (including vehicle terminals and pedestrian terminals) and base stations. PC5 interface communication is based on a device-to-device (D2D) proximity communication service, and realizes V2V, V2I, and V2P direct communication through PC5 interfaces by using a dedicated frequency band for the Internet of vehicles, which has relatively low delay and supports a relatively high mobile speed, but requires good resource allocation and the congestion control algorithm. In an environment without cellular network coverage, adjacent devices can directly communicate with each other. Uu interface communication is an interface between a user equipment and a base station, in which a cellular network frequency band is adopted and the information is transmitted to another node through the V2X server relay, thereby realizing long-distance and wider-range reliable communication.

The C-V2X technology that realizes V2X message transmission through PC5 interfaces or in Uu interface communication manner also supports different levels of autonomous driving of intelligent automobiles (realizing intelligence through network connection and realizing intelligence through radars and cameras of vehicles). C-V2X and mobile communication networks (which are mainly 3G, 4G, 5G, and the like) provide various information services for moving vehicles, including being used for safety reminders (such as collision warning), efficiency reminders (such as congestion reminders), infotainment reminders, and the like. The safety reminders and the efficiency reminders, especially the safety reminders, require the communication network to be capable of providing reliable reminders and information assistance.

The ETC system is one of the service functions of the intelligent transportation system, and it is especially suitable for use in highways or bridge and tunnel environment with heavy traffic. At present, there is a dedicated ETC toll channel at the highway tollbooth. Provided that the car owner installs a proximity card on the front windshield of the vehicle and pre-stores the fee, it is unnecessary to manually pay the toll or stop when passing through the toll station, and the highway toll will be automatically deducted from the card, that is, automatic charging can be realized. This charging system takes less than two seconds to charge each vehicle. With the promotion of the ETC system, the coverage rate of intelligent roadside facilities in the ETC system is relatively high currently. If the ETC system and the enhanced system ETC-X thereof are used for V2X communication, the coverage rate of V2X communication will be greatly increased. That is, after charging through the ETC system, vehicle communication message transmission is implemented through communication between an ETC RSU and an ETC OBU.

As shown in FIG. 1, an exemplary system architecture of this application may include a vehicle terminal 101, a base station 102, a vehicle-road system cloud platform (also referred to as a vehicle-road collaboration cloud platform or a vehicle-road collaboration platform) 103, an edge cloud platform 104, and ETC RSU 105. In some embodiments, the ETC RSU 105 may monitor, collect, and report data in the ETC system to the edge cloud platform 104 for analysis. Certainly, the data may alternatively be analyzed on an ETC roadside device management platform.

The vehicle terminal 101 may communicate with the base station 102 through a Uu interface to acquire a V2X message transmitted by the vehicle-road system cloud platform 103 through the core network. This manner has the characteristics of a high network coverage rate and high mobility. An ETC OBU is mounted on vehicle terminal 101.

The vehicle terminal 101 can also acquire a vehicle-road collaboration message through the RSU based on long term evolution-vehicle (LTE-V) (which may be new radio-vehicle (NR—V) in the future). This manner does not support full coverage, because the LTE-V RSU is only deployed on the roadside and does not cover all road sections. However, this manner can support the transmission of V2V messages and V2I messages on the intelligent traffic system (ITS) frequency band.

After the vehicle communication based on an ETC system is added, a vehicle-road collaboration V2X message can be transmitted through a dedicated short range communication (DSRC) mechanism between the ETC RSU and the ETC OBU. Because ETC is not deployed on the entire road section when used for charging purposes, the expected coverage of this communication manner may be smaller than that of an LTE-V RSU. However, if vehicle-road collaboration implementation based on ETC becomes a more popular technology, the deployment range of ETC RSUs may be expanded, for example, deploying ETC RSUs in accident-prone sections.

The vehicle-road system cloud platform 103 and the edge cloud platform 104 may be servers. The server may be implemented by an independent server, a server cluster including a plurality of servers, or a cloud server. The ETC RSU 105 may be a terminal.

The technical solutions of the embodiments of this application are mainly to use the remaining communication resources to perform V2X message transmission of vehicle-road collaboration and automatic driving while the ETC system completes the charging function. After the ETC RSU performs ETC billing, vehicle communication message interaction is performed with the ETC OBU through the ETC RSU when the ETC OBU is still within a communication range of the ETC RSU, thereby implementing V2X communication based on the ETC system. Due to the relatively high popularity rate of the ETC system, the overall coverage rate of V2X communication can be improved by using the ETC system, thereby implementing reliable V2X reminders and information assistance.

The implementation details of the technical solutions in the embodiments of this application are described below in detail.

Figure 2:
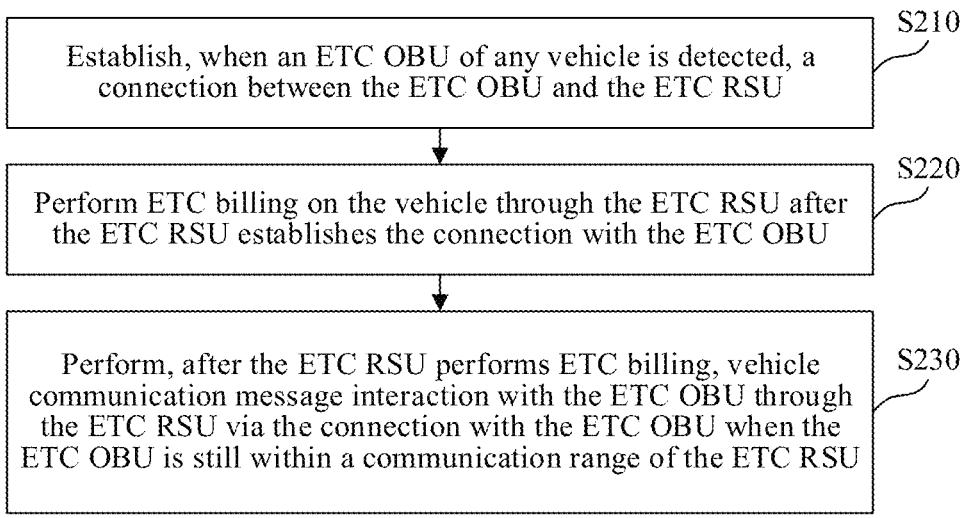
FIG. 2 is a flowchart of a vehicle communication method based on an ETC system according to an embodiment of this application.

FIG. 2 is a flowchart of a vehicle communication method based on an ETC system according to an embodiment of this application. The vehicle communication method based on an ETC system may be performed by an ETC RSU, or may be performed by an ETC backend system connected to a plurality of ETC RSUs. Referring to FIG. 2, the vehicle communication method based on an ETC system includes at least step S210 to step S230, and a detailed description is as follows:

Step S210: Establish, when an ETC OBU of any vehicle is detected, a connection between the ETC OBU and the ETC RSU.

In an embodiment of this application, when it is detected that a distance between a vehicle and the ETC RSU is within a preset distance, the ETC RSU may be triggered to perform ETC OBU detection, the preset distance being greater than or equal to a communication radius of the ETC RSU. In some embodiments, if a detector (for example, a loop detector) is arranged at a set distance from the ETC RSU, when it is detected that the detector is triggered, it can be determined that it is detected that the distance between the vehicle and the ETC RSU is the preset distance, and in this case, the ETC RSU may be triggered to perform ETC OBU detection. Alternatively, whether the distance between the vehicle and the ETC RSU is the preset distance may be determined based on a positioned location of the vehicle. For example, the vehicle may transmit the positioned location to a network side, or the network side may actively determine the positioned location of the vehicle, and then transmit the positioned location to the ETC backend system, and the ETC backend system determines whether to trigger the ETC RSU to perform ETC OBU detection.

Figure 5:
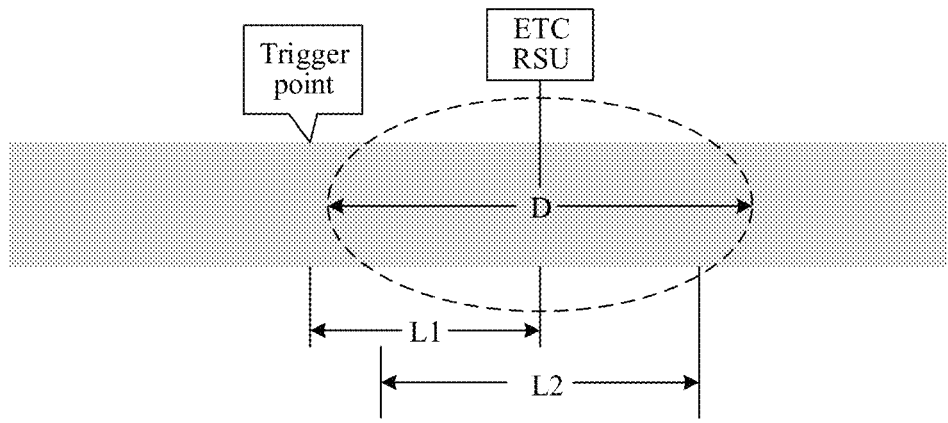
FIG. 5 is a schematic diagram of a communication range of a single RSU according to an embodiment of this application.

In an embodiment of this application, as shown in FIG. 5, a detector may be arranged at a position (that is, at the trigger point) with L1 away from the ETC RSU. When the vehicle passes through this position, the detector is triggered, and in this case, the ETC RSU may be triggered to perform ETC OBU detection. In some embodiments, L1 is greater than or equal to the communication radius D/2 of the ETC RSU, thereby ensuring that the ETC RSU can detect an ETC OBU when the vehicle enters the coverage of the ETC RSU.

Step S220: Perform ETC billing on the vehicle through the ETC RSU after the ETC RSU establishes the connection with the ETC OBU.

In an embodiment of this application, after the ETC RSU establishes a connection with the ETC OBU, the ETC RSU may acquire identifier information of the ETC OBU, and then may interact with an ETC charging platform based on the identifier information to perform billing.

Step S230: Perform, after the ETC RSU performs ETC billing, vehicle communication message interaction with the ETC OBU through the ETC RSU via the connection with the ETC OBU when the ETC OBU is still within a communication range of the ETC RSU.

In an embodiment of this application, the vehicle communication message interaction between the ETC RSU and the ETC OBU is the V2X communication process between the ETC RSU and the ETC OBU, for example, interaction of messages such as safety reminder (for example, collision warning) messages, efficiency reminder (for example, congestion reminder), and infotainment reminder (such as map update and route planning) messages between the ETC RSU and the ETC OBU.

In an embodiment of this application, the ETC RSU needs to perform ETC billing on the vehicle within the effective communication range of the ETC RSU, and the ETC RSU needs to perform vehicle communication message interaction with the ETC OBU within the effective communication range of the ETC RSU, a diameter of the effective communication range being less than a communication diameter of the ETC RSU.

If the ETC RSU and the ETC OBU are not disconnected after the billing, during the connection establishment, the ETC RSU may directly perform vehicle communication message interaction with the ETC OBU. If the ETC RSU and the ETC OBU are disconnected, but the ETC OBU is still within the communication range of the ETC RSU, the connection between the ETC OBU and the ETC RSU may be re-established within the communication range, and then the ETC RSU may perform vehicle communication message interaction with the ETC OBU.

Specifically, as shown in FIG. 5, the diameter of the effective communication range of the ETC RSU is L2, and the communication diameter of the ETC RSU is D, where L2<D. In some embodiments, for a relatively busy region, the ETC RSU needs to serve a plurality of vehicles simultaneously, and then the effective communication range of the ETC RSU may continue to increase. For example, it may be as close as possible to the coverage of the ETC RSU.

In an embodiment of this application, it is assumed that a duration for the ETC RSU to perform ETC billing on the vehicle is t1, and a duration for the ETC RSU and the ETC OBU to perform vehicle communication message interaction is t2, then a sum of t1 and t2 is less than a duration for the vehicle to pass through an effective communication range of the ETC RSU. Specifically, as shown in FIG. 5, it is assumed that a speed of the vehicle is V, then t1+t2<L2/V.

In an embodiment of this application, because the ETC RSU needs to perform OBU identification, establish a connection, and communicate with the ETC backend system when performing ETC billing on the vehicle, the quantity of round-trip signaling hops is larger than that of the vehicle-road collaboration messages; and the vehicle communication message transmission is performed based on a reliable connection established when charging is performed, t2 may be less than t1. Certainly, if the time for the ETC RSU to perform ETC billing on the vehicle is relatively short, and the time for the vehicle to pass through one ETC RSU is relatively long, the duration for vehicle communication message interaction may also be relatively long. That is, there may be a case of t2>t1.

In an embodiment of this application, if communication ranges of a plurality of ETC RSUs coincide with each other, ETC billing may be performed on the vehicle through some of the plurality of ETC RSUs, and after the billing, vehicle communication message interaction is performed with the ETC OBU within effective communication ranges of the plurality of ETC RSUs. For example, if communication ranges of two ETC RSUs coincide with each other, when one of the ETC RSUs performs billing on a vehicle, the vehicle can not only perform vehicle communication message interaction with the ETC RSU performing the billing, but also can perform vehicle communication message interaction with the other ETC RSU without the need to perform ETC billing again.

Figure 6:
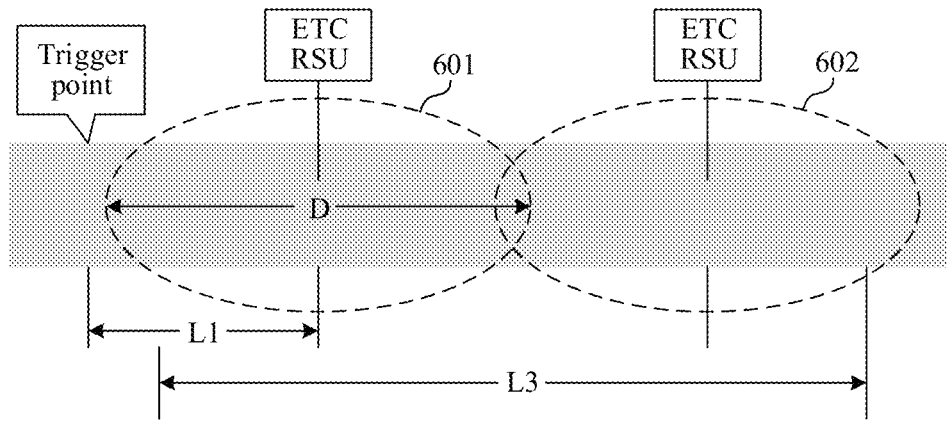
FIG. 6 is a schematic diagram of a communication range of multi—RSU according to an embodiment of this application.

Specifically, as shown in FIG. 6, communication ranges 601 and 602 of two ETC RSUs coincide with each other. After a current ETC RSU is triggered, billing and vehicle communication message interaction may be performed within the communication ranges of the two ETC RSUs. In this case, the overall effective communication range of the two ETC RSUs may be shown in L3 in FIG. 6, that is, from a starting point of the effective communication range of the previous ETC RSU to an end point of the effective communication range of the next ETC RSU. It can be seen that in this embodiment of this application, a plurality of cascaded ETC RSUs may perform cooperation. That is, the plurality of cascaded ETC RSUs will no longer perform charging operations on OBUs on which charging have already being performed, and directly perform transmission of vehicle-road collaboration messages.

In an embodiment of this application, time for the ETC RSU to perform ETC billing on a next vehicle may also be estimated, to determine a duration for which the ETC RSU and the ETC OBU of the current vehicle are capable of performing vehicle communication message interaction; and then vehicle communication message interaction is performed with the ETC OBU through the ETC RSU within the predicted duration.

In some embodiments, vehicle communication message interaction may be performed with the ETC OBU through the ETC RSU in descending order of priorities of vehicle communication messages within the predicted duration. The technical solution of this embodiment can ensure that high-priority vehicle communication messages are transmitted first.

In an embodiment of this application, statistics on performance data of the ETC system may also be collected, and whether to perform vehicle communication message interaction with the vehicle through the ETC system is then decided according to the performance data of the ETC system. Alternatively, the collected performance data of the ETC system may be transmitted to a vehicle-road collaboration platform, for the vehicle-road collaboration platform to decide, according to the performance data of the ETC system, whether to perform vehicle communication message interaction with the vehicle through the ETC system.

In an embodiment of this application, if the performance data of the ETC system is transmitted to the vehicle-road collaboration platform, when it is determined according to the performance data that a target vehicle is capable of receiving a vehicle communication message transmitted by a specified ETC RSU during passing through a coverage of the specified ETC RSU, the vehicle-road collaboration platform may transmit an interaction instruction to the specified ETC RSU, and then the specified ETC RSU may perform vehicle communication message interaction with the ETC OBU mounted on the target vehicle passing through the specified ETC RSU based on the interaction instruction.

In an embodiment of this application, the performance data of the ETC system may include at least one of the following data: historical throughput data of the ETC system, resource data that the ETC system is capable of using for vehicle communication, a quantity of vehicles supported by the ETC RSU in the ETC system, a coverage of the ETC RSU in the ETC system, delay data corresponding to a case from a detector in the ETC system being triggered to the ETC RSU detecting an ETC OBU, delay data corresponding to a case that the ETC RSU in the ETC system establishes a connection with the ETC OBU, and delay data corresponding to a case that the ETC RSU in the ETC system performs vehicle communication message transmission with the ETC OBU.

In an embodiment of this application, the historical throughput data of the ETC system includes the throughput for charging and available resources. The historical throughput data of the ETC system can be used to determine the resources of an ETC RSU for purposes other than charging, that is, how many resources other than resources for charging can be used for other applications, such as vehicle-road collaboration. The resources herein include time resources, and may certainly include bandwidth resources and the like.

In an embodiment of this application, the quantity of vehicles that the ETC RSU can support is not large, and it is also limited by the communication range. In different deployment scenarios, the quantity of vehicles covered by the ETC RSU is different. For an ETC system equipped with a loop detector, the ETC RSU generally cannot actively detect an ETC OBU, but only initiates an inquiry for identifier information of the OBU and establishes a connection after being triggered by the loop detector. Therefore, both the mounting position of the loop detector and the antenna power and directivity configuration of the ETC RSU affect the quantity of vehicles in a vehicle-road collaboration system finally supported by the ETC RSU.

In an embodiment of this application, delay data in the ETC system, for example, delay data corresponding to a case from a detector in the ETC system being triggered to the ETC RSU detecting an ETC OBU, delay data corresponding to a case that the ETC RSU in the ETC system establishes a connection with the ETC OBU, and delay data corresponding to a case that the ETC RSU in the ETC system performs vehicle communication message transmission with the ETC OBU, can be used to determine whether the vehicle needs to acquire vehicle-road collaboration and autonomous driving V2X messages from 5G or C-V2X. For example, if the delay is too long, the vehicle may be incapable of obtaining an effective message reminder during the ETC charging, so that the vehicle shall keep obtaining vehicle-road collaboration and autonomous driving information from 5G or C-V2X in the entire passing process. In this embodiment of this application, the time that can be used for V2X communication can be appropriately estimated through the statistics of the performance data of the ETC system, and then the transmission resources for charging and V2X communication are coordinated.

Figure 3:
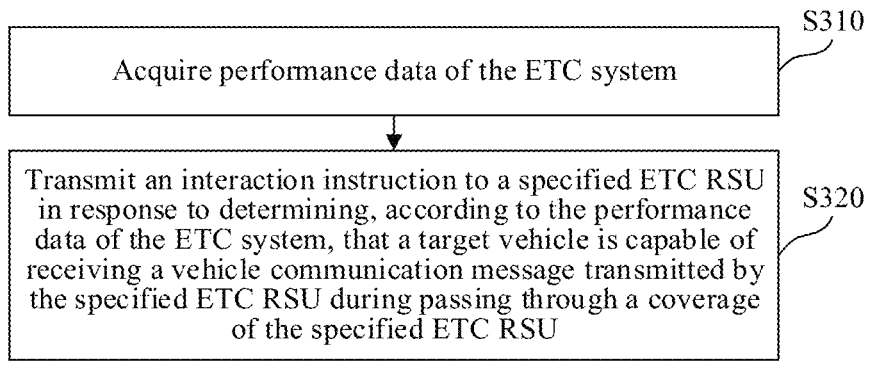
FIG. 3 is a flowchart of a vehicle communication method based on an ETC system according to an embodiment of this application.

FIG. 2 is a description from the perspective of an ETC RSU or an ETC backend system. The following describes the vehicle communication method based on an ETC system according to an embodiment of this application from the perspective of a vehicle-road collaboration platform with reference to FIG. 3:

FIG. 3 is a flowchart of a vehicle communication method based on an ETC system according to an embodiment of this application. The vehicle communication method based on an ETC system may be performed by a vehicle-road collaboration platform. Referring to FIG. 3, the vehicle communication method based on an ETC system includes at least step S310 and step S320, and a detailed description is as follows:

Step S310: Acquire performance data of the ETC system.

In an embodiment of this application, the performance data of the ETC system may be monitored and transmitted to a vehicle-road collaboration platform by an ETC RSU, or may be monitored by the ETC RSU and transmitted to an ETC backend system, and is then transmitted to the vehicle-road collaboration platform by the ETC backend system. For details of the data contents included in the performance data of the ETC system, reference may be made to the technical solution of the foregoing embodiments, and details are not described again.

Step S320: Transmit an interaction instruction to a specified ETC RSU in response to determining, according to the performance data of the ETC system, that a target vehicle is capable of receiving a vehicle communication message transmitted by the specified ETC RSU during passing through a coverage of the specified ETC RSU.

The interaction instruction in step S320 is used for instructing the specified ETC RSU to perform vehicle communication message interaction with an ETC OBU on the target vehicle after performing ETC billing on the target vehicle.

In an embodiment of this application, if when the target vehicle passes through the coverage of the specified ETC RSU, in addition to the ETC billing, there are remaining communication resources (where the communication resources may be time resources and the like), for example, after the ETC billing, the ETC OBU on the target vehicle is still within the communication range of the specified ETC RSU, in this case, it indicates that the target vehicle can receive a vehicle communication message transmitted by the specified ETC RSU when passing through the coverage of the specified ETC RSU.

In an embodiment of this application, vehicle communication message interaction may be performed with the target vehicle in a mobile communication manner in response to determining, according to the performance data of the ETC system, that the target vehicle is incapable of receiving the vehicle communication message transmitted by the specified ETC RSU during passing through the coverage of the specified ETC RSU. In some embodiments, the mobile communication manner may include a 4G communication manner, a 5G communication manner, and the like. Certainly, vehicle communication message interaction may alternatively be performed in a C-V2X communication manner.

Figure 4:
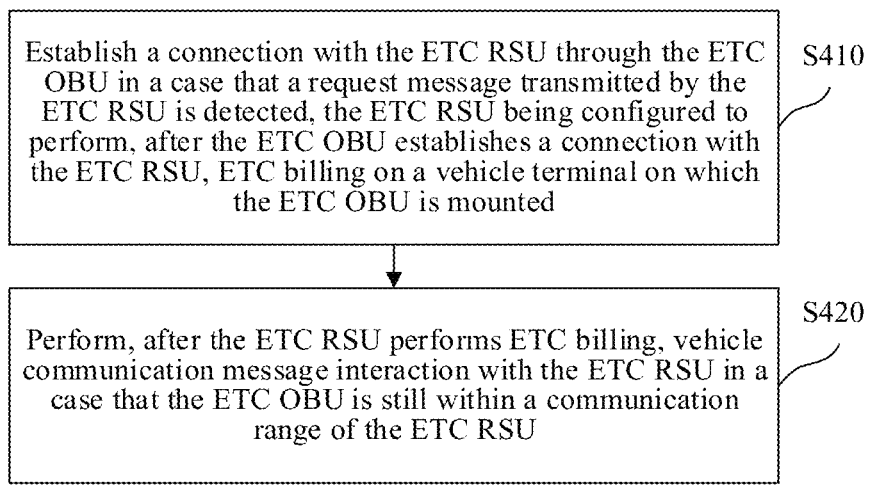
FIG. 4 is a flowchart of a vehicle communication method based on an ETC system according to an embodiment of this application.

FIG. 3 is a description from the perspective of a vehicle-road collaboration platform. The following describes the vehicle communication method based on an ETC system according to an embodiment of this application from the perspective of a vehicle terminal with reference to FIG. 4:

FIG. 4 is a flowchart of a vehicle communication method based on an ETC system according to an embodiment of this application. The vehicle communication method based on an ETC system may be performed by a vehicle terminal. Referring to FIG. 4, the vehicle communication method based on an ETC system includes at least step S410 to step S430, and a detailed description is as follows:

Step S410: Establish a connection with the ETC RSU through the ETC OBU when a request message transmitted by the ETC RSU is detected, the ETC RSU being configured to perform, after the ETC OBU establishes a connection with the ETC RSU, ETC billing on a vehicle terminal on which the ETC OBU is mounted.

In an embodiment of this application, when detecting the ETC OBU mounted on the vehicle terminal, the ETC RSU may transmit a request message to the detected ETC OBU, the request message being used for acquiring identifier information of the ETC OBU. For details, reference may be made to the technical solution of the foregoing embodiments, and details are not described again.

In an embodiment of this application, after the ETC RSU establishes a connection with the ETC OBU, the ETC RSU may acquire identifier information of the ETC OBU, and then may interact with an ETC charging platform based on the identifier information to perform billing.

Step S420: Perform, after the ETC RSU performs ETC billing, vehicle communication message interaction with the ETC RSU when the ETC OBU is still within a communication range of the ETC RSU.

In an embodiment of this application, the process of vehicle communication message interaction between the ETC RSU and the ETC OBU may be that the ETC RSU transmits a V2X message to the ETC OBU, or the ETC OBU transmits a V2X message to the ETC RSU.

Figure 7:
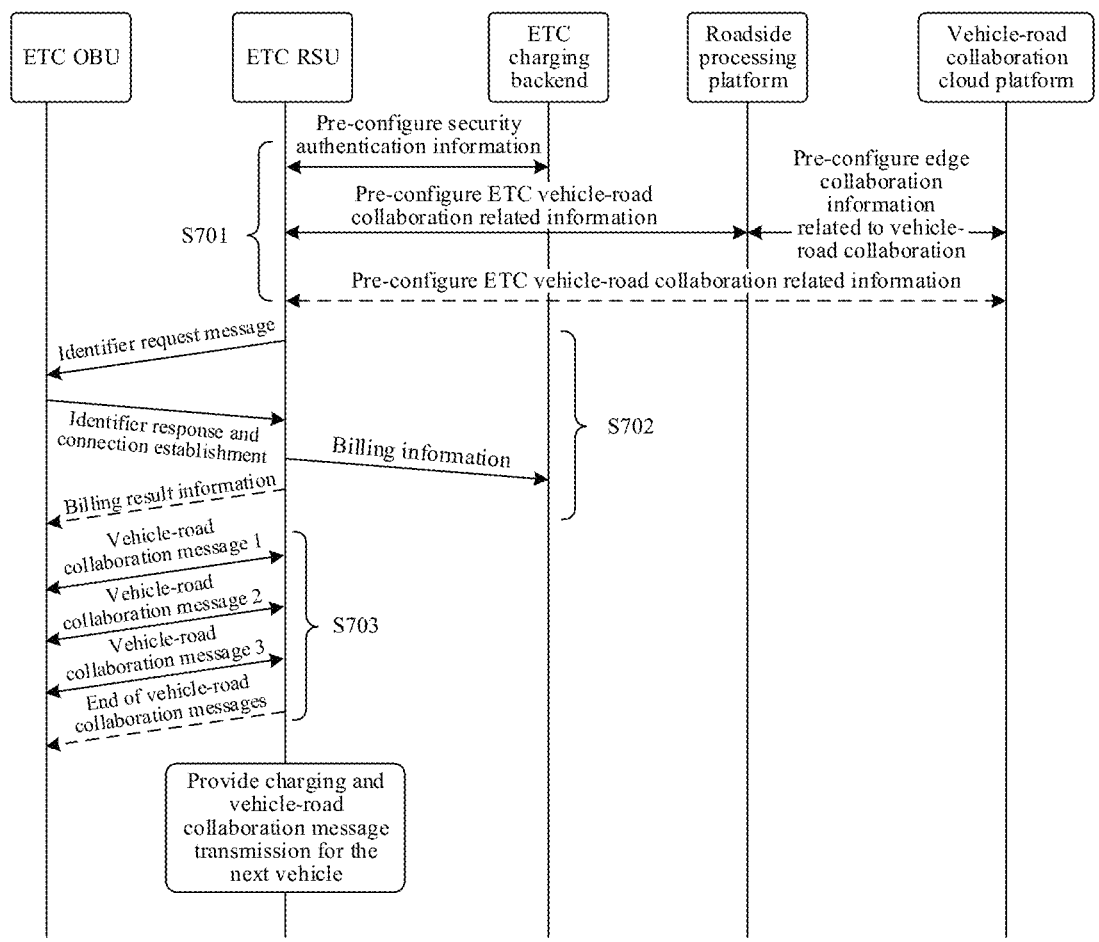
FIG. 7 is a flowchart of a vehicle communication method based on an ETC system according to an embodiment of this application.

The vehicle communication method based on an ETC system according to the embodiments of this application is described above from the perspectives of an ETC RSU (or an ETC backend system), a vehicle-road collaboration platform, and a vehicle terminal respectively. The following further describes the technical solutions of the embodiments of this application from the perspective of interaction between the plurality of entities with reference to FIG. 7:

As shown in FIG. 7, a vehicle communication method based on an ETC system according to an embodiment of this application includes the following steps:

Step S701: Pre-configure security authentication information between an ETC charging backend and an ETC RSU, pre-configure ETC vehicle-road collaboration related information between the ETC RSU and a roadside processing platform, pre-configure edge collaboration information related to vehicle-road collaboration between a vehicle-road collaboration cloud platform and the roadside processing platform, and pre-configure ETC vehicle-road collaboration related information between the ETC RSU and the vehicle-road collaboration cloud platform. In some embodiments, the roadside processing platform shown in FIG. 7 may be the edge cloud platform 104 shown in FIG. 1.

In an embodiment of this application, the pre-configured security authentication information between the ETC charging backend and the ETC RSU may include some or all of the following contents: a vehicle ID, a vehicle owner ID, charging-related information (such as a price, valid time, and a valid time period), password key-related information, a digital certificate, and the like.

In an embodiment of this application, the pre-configured ETC vehicle-road collaboration related information between the ETC RSU and the roadside processing platform may include some or all of the following contents: which V2X information can be transmitted by the ETC RSU to the vehicle, which ETC RSUs can be used for transmitting V2X information, which vehicles can be served by the ETC RSU, and the like.

In an embodiment of this application, the pre-configured edge collaboration information related to vehicle-road collaboration between the vehicle-road collaboration cloud platform and the roadside processing platform may include some or all of the following contents: which V2X information can be transmitted by the ETC RSU to the vehicle, which V2X information can be transmitted to the vehicle by the ETC RSU, which vehicles can be served by the ETC RSU, and the like.

In an embodiment of this application, the pre-configured ETC vehicle-road collaboration related information between the ETC RSU and the vehicle-road collaboration cloud platform may include some or all of the following contents: the vehicle can acquire which V2X information from the ETC RSU, the vehicle can acquire V2X information from which ETC RSUs, and the like.

Step S702: After detecting an ETC OBU, the ETC RSU transmits an identifier request message to the ETC OBU; and after receiving the identifier request message, the ETC OBU transmits an identifier response and connection establishment message to the ETC RSU. After the ETC RSU receives information transmitted by the ETC OBU and establishes a connection, the ETC RSU interacts with the ETC charging backend to perform billing information processing. In some embodiments, after the ETC RSU and the ETC charging backend complete the billing, the ETC RSU may transmit billing result information to the ETC OBU.

Step S703: After the ETC RSU completes the billing, if time permits, vehicle-road collaboration message transmission may be performed between the ETC RSU and the ETC OBU; and if the time available for vehicle-road collaboration is relatively short, high-priority V2X messages may be transmitted first. In some embodiments, after the ETC RSU and the ETC OBU complete the vehicle-road collaboration message transmission, the ETC RSU may transmit information of an end of vehicle-road collaboration messages to the ETC OBU. Subsequently, the ETC RSU may provide charging and vehicle-road collaboration message transmission services for the next vehicle.

The technical solutions of the foregoing embodiments of this application can implement V2X communication based on the ETC system. Due to the relatively high popularity rate of the ETC system, the overall coverage rate of V2X communication can be improved by using the ETC system, thereby implementing reliable V2X reminders and information assistance.

The following describes apparatus embodiments of this application, and the apparatus embodiments may be used for performing the vehicle communication method based on an ETC system in the foregoing embodiment of this application. For details not disclosed in the apparatus embodiments of this application, reference may be made to the foregoing embodiments of the vehicle communication method based on an ETC system of this application.

Figure 8:
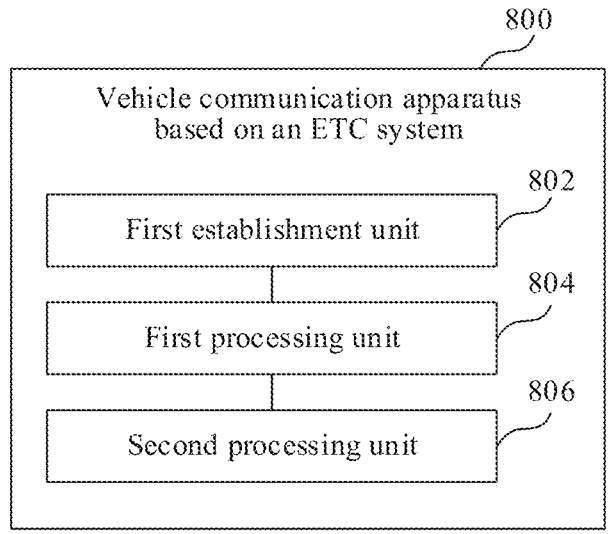
FIG. 8 is a block diagram of a vehicle communication apparatus based on an ETC system according to an embodiment of this application.

FIG. 8 is a block diagram of a vehicle communication apparatus based on an ETC system according to an embodiment of this application. The vehicle communication apparatus based on an ETC system may be arranged in an ETC RSU, or may be arranged in an ETC backend system connected to a plurality of ETC RSUs.

Referring to FIG. 8, a vehicle communication apparatus based on an ETC system 800 according to an embodiment of this application includes: a first establishment unit 802, a first processing unit 804, and a second processing unit 806.

The first establishment unit 802 is configured to establish, when an ETC OBU of any vehicle is detected, a connection between the ETC OBU and the ETC RSU; the first processing unit 804 is configured to perform ETC billing on the vehicle through the ETC RSU after the ETC RSU establishes the connection with the ETC OBU; and the second processing unit 806 is configured to perform, after the ETC RSU performs ETC billing, vehicle communication message interaction with the ETC OBU through the ETC RSU via the connection with the ETC OBU when the ETC OBU is still within a communication range of the ETC RSU.

In some embodiments of this application, based on the foregoing solution, the second processing unit 806 is further configured to: estimate time for the ETC RSU to perform ETC billing on a next vehicle, to determine a duration for which the ETC RSU and the ETC OBU are capable of performing vehicle communication message interaction; and perform vehicle communication message interaction with the ETC OBU through the ETC RSU within the duration.

In some embodiments of this application, based on the foregoing solution, the second processing unit 806 is configured to: perform vehicle communication message interaction with the ETC OBU through the ETC RSU in descending order of priorities of vehicle communication messages within the duration.

In some embodiments of this application, based on the foregoing solution, the vehicle communication apparatus based on an ETC system 800 further includes: a trigger unit, configured to: before an ETC OBU of any vehicle is detected, trigger, when it is detected that a distance between a vehicle and the ETC RSU is within a preset distance, the ETC RSU to perform ETC OBU detection, the preset distance being greater than or equal to a communication radius of the ETC RSU.

In some embodiments of this application, based on the foregoing solution, the trigger unit is configured to: determine, when it is detected that a detector arranged with the preset distance to the ETC RSU is triggered, that it is detected that the distance between the vehicle and the ETC RSU is the preset distance.

In some embodiments of this application, based on the foregoing solution, the trigger unit is configured to: determine whether the distance between the vehicle and the ETC RSU is the preset distance based on a positioned location of the vehicle; and In some embodiments of this application, based on the foregoing solution, the first processing unit 804 is configured to: perform ETC billing on the vehicle through the ETC RSU within an effective communication range of the ETC RSU; and the second processing unit 806 is configured to: perform vehicle communication message interaction with the ETC OBU through the ETC RSU within the effective communication range of the ETC RSU, a diameter of the effective communication range being less than a communication diameter of the ETC RSU.

In some embodiments of this application, based on the foregoing solution, a sum of a duration for the ETC RSU to perform ETC billing on the vehicle and a duration for the ETC RSU and the ETC OBU to perform vehicle communication message interaction is less than a duration for the vehicle to pass through an effective communication range of the ETC RSU.

In some embodiments of this application, based on the foregoing solution, the second processing unit is configured to: perform, when communication ranges of at least two ETC RSUs coincide with each other, vehicle communication message interaction with the ETC OBU within effective communication ranges of the at least two ETC RSUs after ETC billing is performed on the vehicle through at least one of the at least two ETC RSUs.

In some embodiments of this application, based on the foregoing solution, the second processing unit 806 is further configured to: collect statistics on performance data of the ETC system, and decide, according to the performance data of the ETC system, whether to perform vehicle communication message interaction with the vehicle through the ETC system.

In some embodiments of this application, based on the foregoing solution, the second processing unit 806 is further configured to: collect statistics on performance data of the ETC system, and transmit the performance data of the ETC system to a vehicle-road collaboration platform, for the vehicle-road collaboration platform to decide, according to the performance data of the ETC system, whether to perform vehicle communication message interaction with the vehicle through the ETC system.

In some embodiments of this application, based on the foregoing solution, the performance data includes at least one of the following data: historical throughput data of the ETC system, resource data that the ETC system is capable of using for vehicle communication, a quantity of vehicles supported by the ETC RSU in the ETC system, a coverage of the ETC RSU in the ETC system, delay data corresponding to a case from a detector in the ETC system being triggered to the ETC RSU detecting an ETC OBU, delay data corresponding to a case that the ETC RSU in the ETC system establishes a connection with the ETC OBU, and delay data corresponding to a case that the ETC RSU in the ETC system performs vehicle communication message transmission with the ETC OBU.

In some embodiments of this application, based on the foregoing solution, when the performance data of the ETC system is transmitted to the vehicle-road collaboration platform, the second processing unit 806 is further configured to: receive, through a specified ETC RSU, an interaction instruction transmitted by the vehicle-road collaboration platform; and perform, based on the interaction instruction, vehicle communication message interaction with an ETC OBU mounted on a target vehicle passing through the specified ETC RSU, the interaction instruction being pushed by the vehicle-road collaboration platform in response to determining, according to the performance data of the ETC system, that the target vehicle is capable of receiving a vehicle communication message transmitted by the specified ETC RSU during passing through a coverage of the specified ETC RSU.

Figure 9:
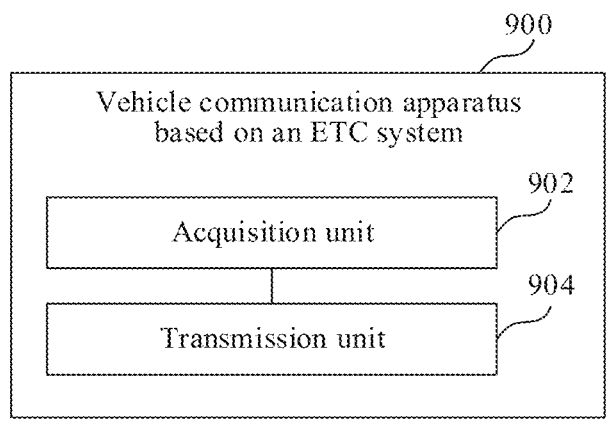
FIG. 9 is a block diagram of a vehicle communication apparatus based on an ETC system according to an embodiment of this application.

FIG. 9 is a block diagram of a vehicle communication apparatus based on an ETC system according to an embodiment of this application. The vehicle communication apparatus based on an ETC system may be arranged in a vehicle-road collaboration platform.

Referring to FIG. 9, a vehicle communication apparatus based on an ETC system 900 according to an embodiment of this application includes: an acquisition unit 902 and a transmission unit 904.

The acquisition unit 902 is configured to acquire performance data of the ETC system; and the transmission unit 904 is configured to transmit an interaction instruction to a specified ETC RSU in response to determining, according to the performance data of the ETC system, that a target vehicle is capable of receiving a vehicle communication message transmitted by the specified ETC RSU during passing through a coverage of the specified ETC RSU, the interaction instruction being used for instructing the specified ETC RSU to perform vehicle communication message interaction with an ETC OBU on the target vehicle after performing ETC billing on the target vehicle.

In some embodiments of this application, based on the foregoing solution, the vehicle communication apparatus based on an ETC system 900 further includes: a communication unit, configured to: perform vehicle communication message interaction with the target vehicle in a mobile communication manner in response to determining, according to the performance data of the ETC system, that the target vehicle is incapable of receiving the vehicle communication message transmitted by the specified ETC RSU during passing through the coverage of the specified ETC RSU.

Figure 10:
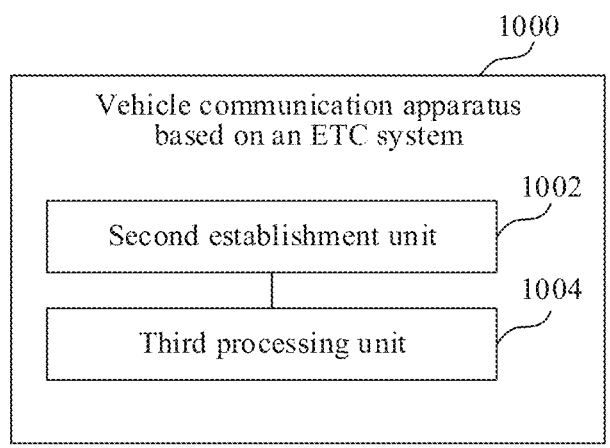
FIG. 10 is a block diagram of a vehicle communication apparatus based on an ETC system according to an embodiment of this application.

FIG. 10 is a block diagram of a vehicle communication apparatus based on an ETC system according to an embodiment of this application. The vehicle communication apparatus based on an ETC system may be arranged in a vehicle terminal.

Referring to FIG. 10, a vehicle communication apparatus based on an ETC system 1000 according to an embodiment of this application includes: a second establishment unit 1002 and a third processing unit 1004.

The second establishment unit 1002 is configured to establish a connection with the ETC RSU through the ETC OBU when a request message transmitted by the ETC RSU is detected, the ETC RSU being configured to perform, after the ETC OBU establishes a connection with the ETC RSU, ETC billing on a vehicle terminal on which the ETC OBU is mounted; and the third processing unit 1004 is configured to perform, after the ETC RSU performs ETC billing, vehicle communication message interaction with the ETC RSU when the ETC OBU is still within a communication range of the ETC RSU.

Figure 11:
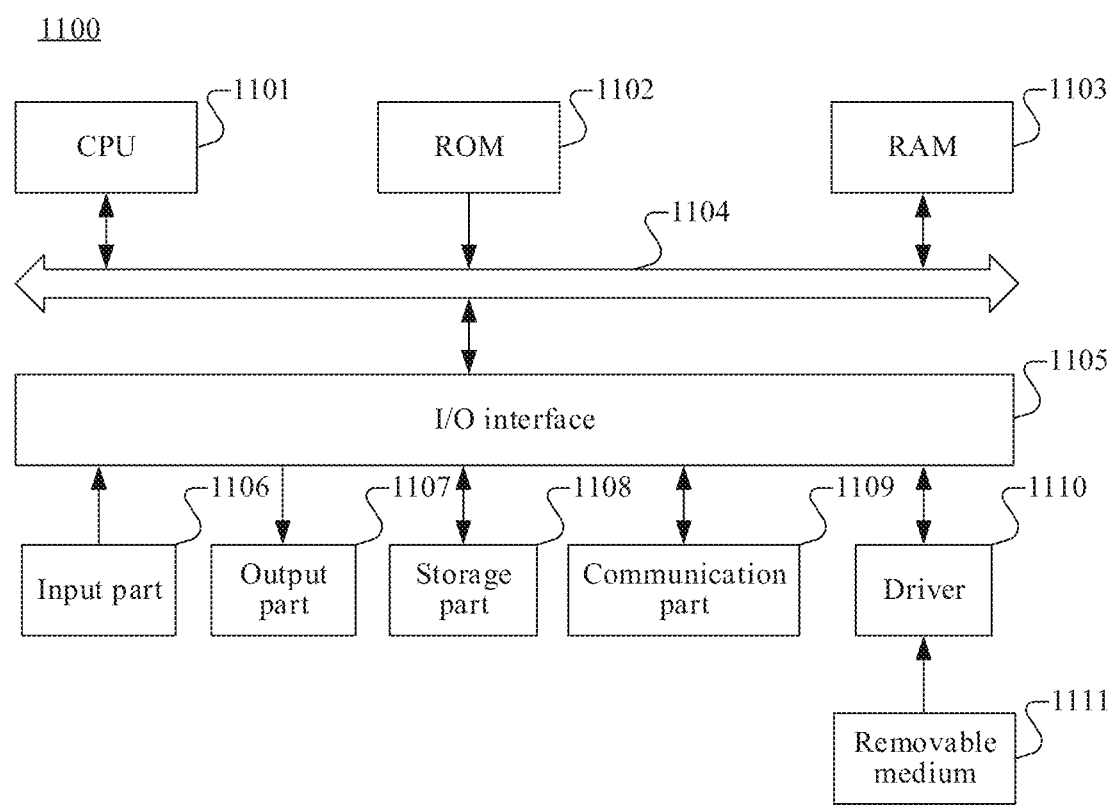
FIG. 11 is a schematic structural diagram of a computer system adapted to implement an electronic device according to an embodiment of this application.

FIG. 11 is a schematic structural diagram of a computer system adapted to implement an electronic device according to an embodiment of this application.

A computer system 1100 of the electronic device shown in FIG. 11 is merely an example, and does not constitute any limitation on functions and use ranges of the embodiments of this application.

As shown in FIG. 11, the computer system 1100 includes a central processing unit (CPU) 1101, which may perform various suitable actions and processing based on computer-readable instructions stored in a read-only memory (ROM) 1102 or computer-readable instructions loaded from a storage part 1108 into a random access memory (RAM) 1103, for example, perform the method described in the foregoing embodiments. The RAM 1103 further stores various computer-readable instructions and data required for system operations. The CPU 1101, the ROM 1102, and the RAM 1103 are connected to each other through a bus 1104. An input/output (I/O) interface 1105 is also connected to the bus 1104.

The following components are connected to the I/O interface 1105: an input part 1106 including a keyboard, a mouse, or the like, an output part 1107 including a cathode ray tube (CRT), a liquid crystal display (LCD), a speaker, or the like, a storage part 1108 including a hard disk, or the like, and a communication part 1109 including a network interface card such as a local area network (LAN) card or a modem. The communication part 1109 performs communication processing by using a network such as the Internet. A driver 1110 is also connected to the I/O interface 1105 as required. A removable medium 1111, such as a magnetic disk, an optical disc, a magneto-optical disk, or a semiconductor memory, is installed on the driver 1110 as required, so that computer-readable instructions read from the removable medium are installed into the storage part 1108 as required.

Particularly, according to an embodiment of this application, the processes described above by referring to the flowcharts may be implemented as computer-readable instructions. For example, an embodiment of this application includes a computer program product. The computer program product includes computer-readable instructions stored in a computer-readable medium. The computer-readable instructions include computer-readable instructions used for performing a method shown in the flowchart. In such an embodiment, the computer-readable instructions may be downloaded and installed from a network through the communication part 1109, and/or installed from the removable medium 1111. When the computer-readable instructions are executed by the CPU 1101, the various functions defined in the system of this application are executed.

The computer-readable medium shown in the embodiments of this application may be a computer-readable signal medium or a non-transitory computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disc read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable instructions. The propagated data signal may be in a plurality of forms, including but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The computer-readable instructions included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this application may be implemented in a software manner, or may be implemented in a hardware manner, and the unit described can also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not disposed in the electronic device. The computer-readable medium carries computer-readable instructions, the computer-readable instructions, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be embodied in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the implementations of this application may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of this application.

After considering the specification and practicing the implementations of the present disclosure, a person skilled in the art may easily conceive of other implementations of this application. This application is intended to cover any variations, uses, or adaptive changes of this application following the general principles of this application, and includes well-known knowledge and conventional technical means in the art and undisclosed in this application.

It is to be understood that this application is not limited to the precise structures described above and shown in the accompanying drawings, and various modifications and changes may be made without departing from the scope of this application. The scope of this application is subject only to the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A vehicle communication method performed by one or more processors of an electronic toll collection (ETC) system, wherein the ETC system comprises an ETC roadside unit (RSU), a loop detector arranged at a preset distance from the ETC RSU, and an ETC onboard unit (OBU), wherein each of the ETC RSU and the ETC OBU has a processor, a memory and computer-readable instructions stored in the corresponding memory that are configured to be executed by the corresponding processor to perform the vehicle communication method collectively, and the method comprising:

triggering, by the one or more processors, when the loop detector determines that a distance between an ETC OBU on a first vehicle and the ETC RSU is within the preset distance, the ETC RSU to perform ETC OBU detection on the ETC OBU on the first vehicle, the preset distance being greater than or equal to a communication radius of the ETC RSU;

establishing, by the one or more processors, when the ETC OBU on the first vehicle is detected, a connection between the ETC OBU on the first vehicle and the ETC RSU;

performing, by the one or more processors, ETC billing on the first vehicle through the ETC RSU after the ETC RSU establishes the connection with the ETC OBU on the first vehicle;

estimating, by the one or more processors, time for the ETC RSU to perform billing on a second vehicle after the ETC RSU performs the ETC billing on the first vehicle, to determine a duration for which the ETC RSU and the ETC OBU on the first vehicle are capable of performing vehicle communication message interaction based on a speed of the first vehicle and an effective communication range of the ETC RSU; and performing, by the one or more processors, after the ETC RSU performs the ETC billing on the first vehicle, vehicle-to-everything (V2X) communication message interaction with the ETC OBU on the first vehicle through the ETC RSU via the connection with the ETC OBU from a remote device within the duration when the ETC OBU is still within the effective communication range of the ETC RSU.

2. The vehicle communication method according to claim 1, wherein the performing V2X communication message interaction with the ETC OBU on the first vehicle through the ETC RSU within the duration comprises:

performing V2X communication message interaction with the ETC OBU through the ETC RSU in a descending order of priorities of vehicle communication messages within the duration.

3. The vehicle communication method according to claim 1, wherein a sum of a duration for the ETC RSU to perform the ETC billing on the first vehicle and the duration for the ETC RSU and the ETC OBU on the first vehicle to perform the V2X communication message interaction is less than a duration for the first vehicle to pass through the effective communication range of the ETC RSU.

4. The vehicle communication method according to claim 1, further comprising:

performing, when communication ranges of at least two ETC RSUs coincide with each other, V2X communication message interaction with the ETC OBU on the first vehicle within effective communication ranges of the at least two ETC RSUs after the ETC billing is performed on the first vehicle through at least one of the at least two ETC RSUs.

5. The vehicle communication method according to claim 1, wherein the vehicle communication method further comprises:
collecting, by the one or more processors, performance data of the ETC system, and transmitting the performance data of the ETC system to a vehicle-road collaboration platform, for the vehicle-road collaboration platform to decide, according to the performance data of the ETC system, whether to perform vehicle communication message interaction with the first vehicle through the ETC system.

6. The vehicle communication method according to claim 5, wherein the performance data comprises at least one of the following data:
historical throughput data of the ETC system, resource data that the ETC system is capable of using for vehicle communication, a quantity of vehicles supported by the ETC RSU in the ETC system, a coverage of the ETC RSU in the ETC system, delay data corresponding to a case from a detector in the ETC system being triggered to the ETC RSU detecting an ETC OBU, delay data corresponding to a case that the ETC RSU in the ETC system establishes a connection with the ETC OBU, and delay data corresponding to a case that the ETC RSU in the ETC system performs vehicle communication message transmission with the ETC OBU.

7. The vehicle communication method according to claim 5, wherein the vehicle communication method further comprises:
receiving, through the ETC RSU, an interaction instruction transmitted by the vehicle-road collaboration platform; and
performing, by the one or more processors, based on the interaction instruction, V2X communication message interaction with the ETC OBU mounted on the vehicle passing through the ETC RSU, the interaction instruction being pushed by the vehicle-road collaboration platform in response to determining, according to the performance data of the ETC system, that the vehicle is capable of receiving a vehicle communication message transmitted by the ETC RSU during passing through a coverage of the ETC RSU.

8. An electronic toll collection (ETC) system, the ETC system comprising:
an ETC roadside unit (RSU);
a loop detector arranged at a preset distance from the ETC RSU; and
an ETC onboard unit (OBU);
wherein each of the ETC RSU and the ETC OBU has a processor, a memory and computer-readable instructions stored in the corresponding memory that are configured to be executed by the corresponding processor;
wherein the one or more processors are configured to trigger, when the loop detector determines that a distance between an ETC OBU on a first vehicle and the ETC RSU is within the preset distance, the ETC RSU to perform ETC OBU detection on the ETC OBU on the first vehicle, the preset distance being greater than or equal to a communication radius of the ETC RSU;
wherein the one or more processors are configured to establish, when the ETC OBU on the first vehicle is detected, a connection between the ETC OBU on the first vehicle and the ETC RSU;
wherein the one or more processors are configured to perform ETC billing on the first vehicle through the ETC RSU after the ETC RSU establishes the connection with the ETC OBU on the first vehicle;
wherein the one or more processors are configured to estimate time for the ETC RSU to perform billing on a second vehicle after the ETC RSU performs the ETC billing on the first vehicle, to determine a duration for which the ETC RSU and the ETC OBU on the first vehicle are capable of performing vehicle communication message interaction based on a speed of the first vehicle and an effective communication range of the ETC RSU; and
wherein the one or more processors are configured to perform, after the ETC RSU performs the ETC billing on the first vehicle, vehicle-to-everything (V2X) communication message interaction with the ETC OBU on the first vehicle through the ETC RSU via the connection with the ETC OBU from a remote device within the duration when the ETC OBU is still within the effective communication range of the ETC RSU.

9. The ETC system according to claim 8, wherein a sum of a duration for the ETC RSU to perform the ETC billing on the first vehicle and the duration for the ETC RSU and the ETC OBU on the first vehicle to perform the V2X communication message interaction is less than a duration for the first vehicle to pass through the effective communication range of the ETC RSU.

10. The ETC system according to claim 8, further comprising:
at least two ETC RSUs;
wherein the at least two RTC RSUs are configured to perform, when communication ranges of the at least two ETC RSUs coincide with each other, V2X communication message interaction with the ETC OBU on the first vehicle within effective communication ranges of the at least two ETC RSUs after the ETC billing is performed on the vehicle through at least one of the at least two ETC RSUs.

11. The ETC system according to claim 8,
wherein the one or more processors are configured to collect performance data of the ETC system, and transmit the performance data of the ETC system to a vehicle-road collaboration platform, for the vehicle-road collaboration platform to decide, according to the performance data of the ETC system, whether to perform vehicle communication message interaction with the first vehicle through the ETC system.

12. The ETC system according to claim 11,
wherein the one or more processors are configured to receive, through the ETC RSU, an interaction instruction transmitted by the vehicle-road collaboration platform; and
wherein the ETC RSU is further configured to perform, based on the interaction instruction, V2X communication message interaction with the ETC OBU mounted on the vehicle passing through the ETC RSU, the interaction instruction being pushed by the vehicle-road collaboration platform in response to a determination, according to the performance data of the ETC system, that the vehicle is capable of receiving a vehicle communication message transmitted by the ETC RSU during passing through a coverage of the ETC RSU.

13. The ETC system according to claim 11, wherein the performance data comprises at least one of the following data:

historical throughput data of the ETC system, resource data that the ETC system is capable of using for vehicle communication, a quantity of vehicles supported by the ETC RSU in the ETC system, a coverage of the ETC RSU in the ETC system, delay data corresponding to a case from a detector in the ETC system being triggered to the ETC RSU detecting an ETC OBU, delay data corresponding to a case that the ETC RSU in the ETC system establishes a connection with the ETC OBU, and delay data corresponding to a case that the ETC RSU in the ETC system performs vehicle communication message transmission with the ETC OBU.

14. The ETC system according to claim 8,
wherein the one or more processors are configured to perform V2X communication message interaction with the ETC OBU on the first vehicle through the ETC RSU in a descending order of priorities of vehicle communication messages within the duration.

15. One or more non-transitory computer-readable media storing computer-readable instructions when executed by one or more processors of an electronic toll collection (ETC) system cause the one or more processors to perform a vehicle communication method, wherein the ETC system comprises an ETC roadside unit (RSU), a loop detector arranged at a preset distance from the ETC RSU, and an ETC onboard unit (OBU), wherein each of the ETC RSU and the ETC OBU has a processor configured to execute the corresponding computer-readable instructions, the method including:
triggering, by the one or more processors, when the loop detector determines that a distance between an ETC OBU on a first vehicle and the ETC RSU is within the preset distance, the ETC RSU to perform ETC OBU detection on the ETC OBU on the first vehicle, the preset distance being greater than or equal to a communication radius of the ETC RSU;
establishing, by the one or more processors, when the ETC OBU on the first vehicle is detected, a connection between the ETC OBU on the first vehicle and the ETC RSU;
performing, by the one or more processors, ETC billing on the first vehicle through the ETC RSU after the ETC RSU establishes the connection with the ETC OBU on the first vehicle;
estimating, by the one or more processors, time for the ETC RSU to perform billing on a second vehicle after the ETC RSU performs the ETC billing on the first vehicle, to determine a duration for which the ETC RSU and the ETC OBU on the first vehicle are capable of performing vehicle communication message interaction based on a speed of the first vehicle and an effective communication range of the ETC RSU; and
performing, by the one or more processors, after the ETC RSU performs the ETC billing on the first vehicle, vehicle-to-everything (V2X) communication message interaction with the ETC OBU on the first vehicle through the ETC RSU via the connection with the ETC OBU from a remote device within the duration when the ETC OBU is still within the effective communication range of the ETC RSU.

16. The non-transitory computer readable media according to claim 15, wherein the performing V2X communication message interaction with the ETC OBU on the first vehicle through the ETC RSU within the duration comprises:
performing, by the one or more processors, V2X communication message interaction with the ETC OBU on the first vehicle through the ETC RSU in a descending order of priorities of vehicle communication messages within the duration.

17. The non-transitory computer readable media according to claim 15, wherein a sum of a duration for the ETC RSU to perform the ETC billing on the first vehicle and the duration for the ETC RSU and the ETC OBU on the first vehicle to perform the V2X communication message interaction is less than a duration for the first vehicle to pass through the effective communication range of the ETC RSU.

18. The non-transitory computer readable media according to claim 15, wherein the vehicle communication method further comprises:
performing, by the one or more processors, when communication ranges of at least two ETC RSUs coincide with each other, V2X communication message interaction with the ETC OBU on the first vehicle within effective communication ranges of the at least two ETC RSUs after the ETC billing is performed on the vehicle through at least one of the at least two ETC RSUs.

19. The non-transitory computer readable media according to claim 15, wherein the vehicle communication method further comprises:
collecting, by the one or more processors, performance data of the ETC system, and transmitting the performance data of the ETC system to a vehicle-road collaboration platform, for the vehicle-road collaboration platform to decide, according to the performance data of the ETC system, whether to perform vehicle communication message interaction with the first vehicle through the ETC system.

20. The non-transitory computer readable media according to claim 19, wherein the vehicle communication method further comprises:
receiving, by the one or more processors, through the ETC RSU, an interaction instruction transmitted by the vehicle-to-road collaboration platform; and
performing, by the one or more processors, based on the interaction instruction, V2X communication message interaction with the ETC OBU mounted on the vehicle passing through the ETC RSU, the interaction instruction being pushed by the vehicle-road collaboration platform in response to determining, according to the performance data of the ETC system, that the vehicle is capable of receiving a vehicle communication message transmitted by the ETC RSU during passing through a coverage of the ETC RSU.

* * * * *